United States Patent [19]

Feigel

[11] 3,874,144
[45] Apr. 1, 1975

[54] APPARATUS FOR TESTING AND EMPLACING FLEXIBLE SEALED PACKAGES

[75] Inventor: Harold J. Feigel, Teaneck, N.J.

[73] Assignee: Neo-Dyne Industries, Inc., Linden, N.J.

[22] Filed: Mar. 19, 1973

[21] Appl. No.: 342,788

[52] U.S. Cl............ 53/53, 53/54, 53/165, 53/167
[51] Int. Cl............ B65b 57/00, B65b 5/06
[58] Field of Search ........ 53/53, 54, 59 W, 78, 164, 53/165, 167; 73/49.3, 52; 141/83; 177/45, 50, 52, 225; 198/39

[56] References Cited
UNITED STATES PATENTS

| | | | |
|---|---|---|---|
| 2,649,231 | 8/1953 | Ferguson et al. | 53/150 X |
| 3,091,114 | 5/1963 | Webster | 73/49.3 |
| 3,359,702 | 12/1967 | Beert et al. | 53/78 X |
| 3,642,128 | 2/1972 | Westwood et al. | 177/50 X |
| 3,708,949 | 1/1973 | Wilcox | 53/53 |

Primary Examiner—Robert L. Spruill
Attorney, Agent, or Firm—Stefan J. Klauber

[57] ABSTRACT

Apparatus for testing and emplacing flexible packages provided thereto from a form, fill and seal machine. The apparatus includes conveyor means for advancing the incoming packages to a weighing and leak-seal test station. A weight check is performed at such station by examining the initial peak displacement of a weighing platen at such station. If the weight test yields a satisfactory result, a fluid pressure driven ram is brought down upon the package and stopped at a fixed reaction pressure, the movement of the ram beyond a pre-set limit point being taken as an indication of pressure leak in the package and providing a defect signal. Signals indicative of rejection for weight or gas leak causes are stored in an appropriate memory, and the thus-identified defective package pushed off the conveyor at a downstream point. Upon a predetermined number of acceptable packages being transferred and assembled at a collection area adjacent the main conveyor, the group of acceptable packages are transferred and layered into a shipping case.

11 Claims, 10 Drawing Figures

APPARATUS FOR TESTING AND EMPLACING FLEXIBLE SEALED PACKAGES

BACKGROUND OF INVENTION

This invention relates generally to packaging apparatus, and more specifically relates to apparatus adapted for testing flexible, food-containing packages, and emplacing packages determined to be acceptable in cartons for shipment thereof.

Within recent years an ever-increasing market for snack-type food items, such as potato chips, pretzels, pop corn or so forth, has stimulated a commensurate interest in methodology for packaging and purveying such items. Most commonly food items of the foregoing type are packaged in flexible sealed bags formed of cellophane or transparent thermo-plastics such as polyethylene film, etc. By packaging the food items in this manner, they are not only protected and rendered attractive for the consumer, but at the same time are provided in small enough portions as to be rapidly consumed when opened, thereby assuring the freshness thereof.

The flexible bags in question are typically provided in their ready-to-vend form, from a so-called form, fill and seal machine which forms individual bags from webs or tubes of the plastic material, fills the bags with a measured quantity of the food item in question, and then seals the said bags as, for example, by heating. In order, further, to assure that the food item will be in fully acceptable condition when opened by the consumer, the said bags prior to sealing may be filled with an inert gas, such as nitrogen or argon, which excludes oxygen from the said bag, and thereby inhibits oxidation of the food product. Alternatively a fixed quantity of air is sealed in the bag; the oxygen in such air reacts with anti-oxidants in the food product, or packaging material, at which point an equilibrium is reached and little further oxidation occurs.

It will be apparent from the foregoing that two key defects may result from packaging of the cited food products by the foregoing techniques, either of which may impair the resultant product. In the first instance, it is readily possible for an inadequate amount, by weight, of the food product to be deposited in an individual bag. If a bag defective in this respect is provided to the consumer, not only is the reputation and good will of the seller adversely affected, but moreover increasingly stringent Federal and State consumer protection laws may be violated. From a viewpoint of the product itself, at least an equally serious problem is that the individually sealed packages may be defective in such respect that a gas leak occurs between the package and atmosphere. Where such condition obtains, oxidation of the food product can occur, which rapidly impairs the taste and texture characteristics of the product.

In accordance with the foregoing, various apparatus have been proposed in use in the packaging industry, which apparatus are intended to perform testing of the characteristics of packages of the type treated herein. With respect to the cited problem of gas leakage, for example, relatively sophisticated apparatus is known wherein a compressible food package such as the snack-type package dealt with herein, is placed within a chamber and subjected by application of a ram-platen, to pressure causing gas to exude if an unsealed point is present. Apparatus of this type is, for example, shown in U.S. Pat. No. 3,091,114, wherein the gas within the chamber is actually analyzed to determine if leakage has occurred. Similarly, in U.S. Pat. No. 3,117,441 the expansion of a sealed flexible package in a negative pressure environment is utilized as a measure of the effectiveness of sealing. In all of these prior art systems, however, testing for gas leaks in said packages has been accomplished by exceedingly complex techniques which are indeed not adapted to rapid production testing operations. Neither has the methodology of the prior art suitably combined leak-testing of such flexible packages with simple and rapid means for checking the weight of individual packages and providing for rejection of bags found to be defective, thereby assuring that defective bags are not packed in shipping cases and thus made available for the consumer.

In accordance with the foregoing, it may be regarded as an object of the present invention to provide apparatus which accepts flexible, sealed packages from form, fill and seal machine or the like, and rapidly and effectively tests such packages for weight and sealing status, rejecting those packages found to be defective in either of the said respects.

It is a further object of the present invention to provide apparatus which rapidly and effectively tests sealed, flexible packages presented thereto, for weight and sealing conditions, and after rejection of the defective packages acts to accumulate and emplace acdeptable packages in a neat layered fashion in a packing case positioned at the said machine.

It is a yet further object of the present invention to provide method and apparatus, according to which a flexible, sealed package may be tested to determine the adequacy of sealing thereof, in a rapid and expeditious manner, without damage to the package, and without the use of sophisticated and expensive electronic or gas analysis techniques.

SUMMARY OF INVENTION

Now in accordance with the present invention, the foregoing objects and others as will become apparent in the course of the ensuing specification are achieved in apparatus adapted to directly receive flexible packages discharged from a form, fill and seal machine. The apparatus includes a plurality of stations which enable testing of the packages presented thereto, from a viewpoint of both weight and sealing characteristics. The said apparatus includes conveyor means which receives the incoming packages and transfers same to a weight and seal testing station. An underlying weighing platen is present at such station and means are provided for performing a weight check by examining the initial peak displacement of the platen as the package is positioned thereon. If the weight test yields a satisfactory result, a fluid pressure-driven ram is brought down upon the package, which remains at the station. The ram is pre-set to stop at a fixed reaction pressure, and its movement beyond a pre-set limit point is taken as an indication of pressure leak in the package.

Signals indicative of rejection for either weight or gas-leak causes are derived at the weight and seal testing station, and are stored in an appropriate memory, such as a relay or other latching means. The thus identified defective package is pushed off the conveyor by advancement of the same paddles which bring the said packages to the weight and seal check station. If the package passes said tests a push-off paddle is provided for transferring the acceptable package to an accumulator tray in proximity to the weighing and pressure check station. Means are provided for counting the number of acceptable packages accumulated, and when a pre-determined number have been thus arranged, a pickup head descends from an overhead point to the accumulator tray, and secures and lifts the accumulated packages. The said head is mounted for transverse movement on a cross member passing overhead between the accumulator tray and a box conveyor. The pickup head after transversing the said cross member, descends and deposits the accumulated several packages in a case positioned for receiving same on the box conveyor. Means are provided for enabling the pickup head to descend to varying and discrete levels within the said case in order to enable layering of the packages being deposited in the said box.

BRIEF DESCRIPTION OF DRAWINGS

The invention is diagrammatically illustrated by way of example in the drawings appended hereto in which.

DESCRIPTION OF PREFERRED EMBODIMENT

Figure 1:
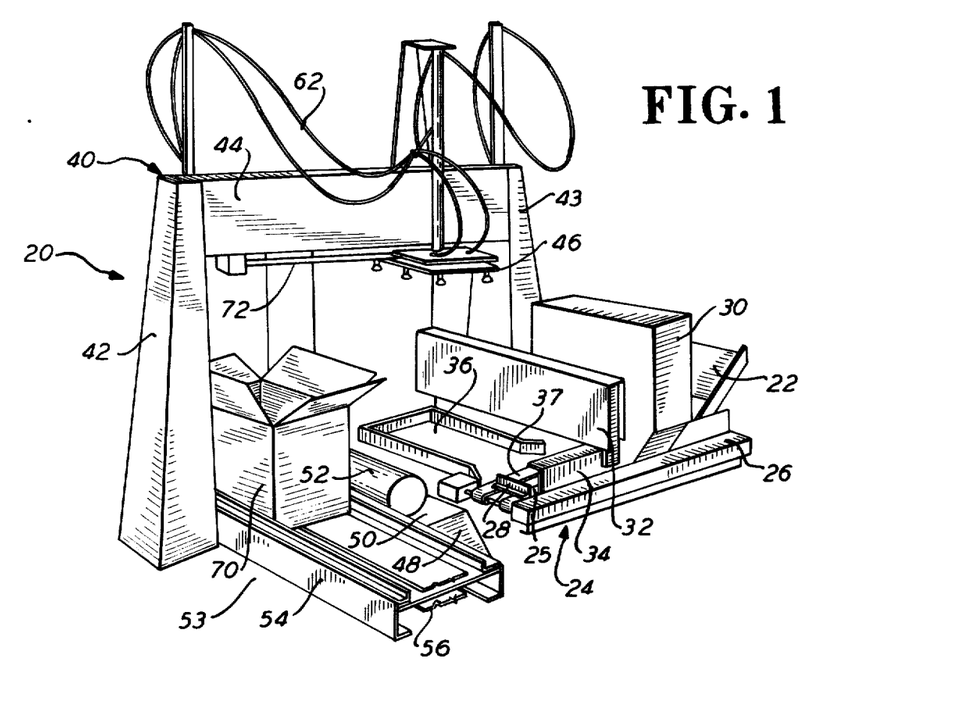
FIG. 1 is a perspective view of a testing and emplacing apparatus in accordance with the present invention.

In FIG. 1 herein a perspective view appears of a testing and emplacing apparatus 20 in accordance with the present invention. The apparatus 20 is seen to include at its input end, an input chute 22, which is oriented an angle of approximately 45° with respect to the vertical. This chute 22 is adapted to be placed in proximity to the output end of a conventional form, fill and seal machine. The latter machines are well-known in the packaging art and typically are intended to firstly form a flexible bag as, for example, from a web or tube of thermoplastic materials, supplied to such machine; and thereupon fill the resultant bag with a comestible such as pop corn, potato chips, or other food product. The amount of filling of the said bag is determined by volume or weight in accordance with a prescribed control level set in the machine; and typically the machine, after providing an inert gas such as nitrogen or a predetermined quantity of air into the filled bag, seals the resulting package, as by heat sealing. Presumably the resultant packages discharged from the machine are then ready, subject to inspection and testing, for packaging into cartons for distribution to the consumer.

The individual bags descending upon input chute 22 impinge upon an input photocell 64, not explicitly apparent in FIG. 1. This serves, in a manner which will be discussed further in connection with FIG. 2, to initiate forward movement of the bag conveyor generally designated at 24. The latter includes the bag conveyor frame 26 and a conveying surface 25 over which a series of bag conveyor paddles 28 progress, moving the package to the weight and seal check station, generally indicated at 30. Upon the package reaching station 30, the bag conveyor stops, to permit the checking operations to be effected. At station 30 a weight check is first carried out, according to which it is determined whether the weight of the said package falls below a prescribed and pre-set minimum amount. If the package is defective in such respect the pressure check is not made, and upon bag conveyor 24 being activated for two further cycles of operation, the bag conveyor paddle 28 continues its forward progression to a point where it drives the defective package against reject chute deflector 50, which in turn forces the defective package on to reject chute 48, and off the machine. If the said package, however, meets the minimum weight requirement, a pressure testing platen (which will be discussed further hereinbelow) descends vertically within its mountings at station 30, and is brought to bear against the bag in order to perform a pressure check. Should the bag fail to perform satisfactorily in this respect, the bag conveyor upon its next two cycles of operation pushes the defective package onto the reject chute 48, as has been previously indicated.

If the package being tested at station 30 performs satisfactorily with respect to both weight and pressure characteristics, the package after advancement to the accumulator tray threshold 37 is acted upon by the accumulator paddle 34 driven by an accumulator conveyor motor contained within housing 32. Paddle 34, in particular, pushes the acceptable package across onto accumulator tray 36. Thereafter successive packages passing down input chute 22, are subjected to a similar sequence of events, until a pre-set number of acceptable packages are accumulated in side-by-side fashion at accumulator tray 36. Typically three such packages may be thus accumulated, but a greater or lesser number may be accumulated, as desired.

A transfer carrier frame 40 straddles the overhead space between accumulator tray 36 and a box conveyor, generally indicated at 53. The latter includes a frame 54 having a conveyor belt 56 mounted about rollers or the like, which are driven in conventional fashion, as by a motor 92 so as to advance a case such as 70, along the conveyor belt 56. The case 70 is positioned during operation of the machine in a loading position, as indicated, and in a manner which will be set forth. The transfer carrier frame includes a pair of uprights 42, 43, supporting thereacross the carrier frame cross member 44. A vacuum pickup head 46 is mounted for traversing movement between the uprights 42 and 43 upon suitable traversing rails 72. The pickup head 46 is also mounted for vertical movement. Upon the pre-set number of packages being thus accumulated the pickup head 46 descends, and upon reaching the packages to be lifted, effects engagement by means of suction heads. Thereupon the head, now carrying the packages, ascends vertically and thereupon traverses across member 44 to a position directly overhead the case 70. Thereupon head 46 descends onto case 70, and upon reaching a prescribed level in such case releases the conveyed packages into the case. This general process is repeated several times, during the course of which layers of packages are deposited in the case 70, the level to which the head descends being successively higher in order to effect such layering. A desired number of layers may be thus built up, as for example, three to six layers or more. It should also be appreciated that a "layer" need not necessarily comprise one row of packages; arrays of multiple rows and colums of packages can be formed (e.g., a 4 × 3 layer) by depositing successive rows of packages adjacent to each other at a common level in the case.

Upon the loading of the case 70 being completed, the box conveyor motor 58 is enabled to remove the loaded case and and bring a second case to a loading position. Upon the second case being positioned, means are provided for disenabling the box conveyor motor, for stopping the case at the load position. It will be clear hereinbelow that with the exception of the box conveyor motor the various other motor elements present in the system are preferably pneumatic in nature, and for such purposes a pneumatic pump may be provided. Various pneumatic connection lines are seen generally at 62, connecting to various points of the apparatus.

Figure 2:
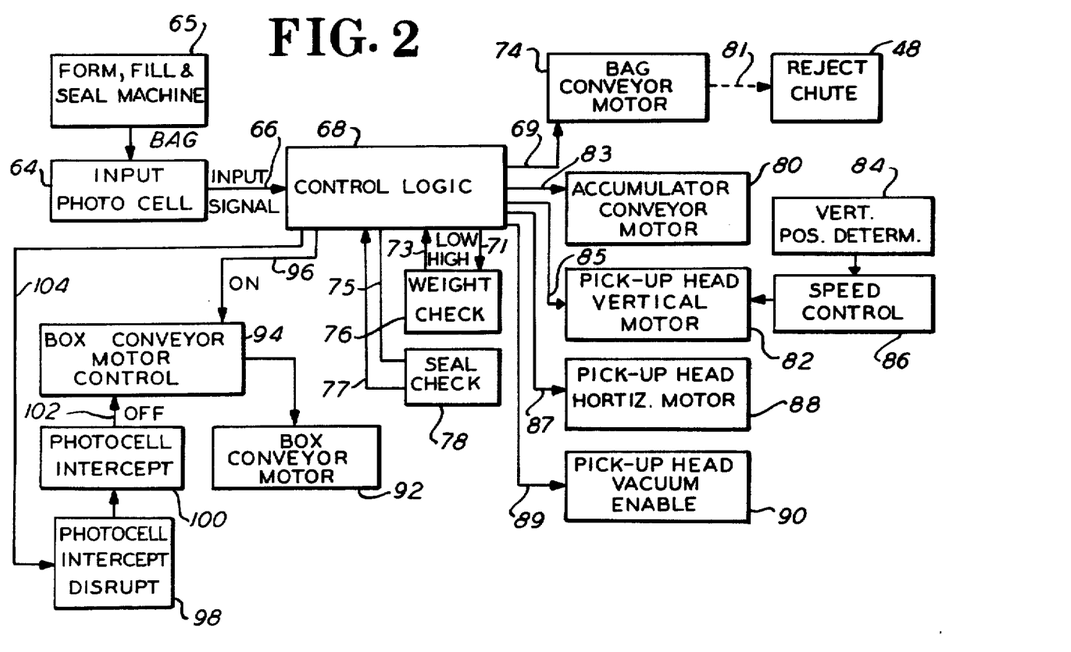
FIG. 2 is a simplified schematic block diagram, illustrating overall operation of the control system for the FIG. 1 apparatus.

In FIG. 2 a simplified schematic block diagram sets forth the overall operation of the control system for apparatus 20. All functions for the said apparatus are sequenced and controlled by control logic block 68. The latter includes the various memory elements for the system, and the switching elements which enables the several functions which will be set forth. The individual elements of block 68 are conventional, and are therefore not each set forth in specific detail. For example, since the bulk of the motor functions herein are pneumatically actuated, conventional solenoid-operated valves enabling pressurization of the various motor systems are contained within control logic block 68. The memory elements referred to, most commonly comprise simple electromechanical latches, such as relays; however, it is of course within the province of the invention for the electromechanical latches to be replaced by equivalent electronic means as, for example, SCR's.

Referring further to FIG. 2 and as has been previously indicated, a bag in the form of a flexible container is provided from the form, fill and seal machine 65. A photocell 64 and light source are positioned so that the source light path traverses bag conveyor 24 at a point adjacent where the bag impinges. The resultant input signal is provided via a control line 66 to control logic 68. The latter then provides a control signal via line 69, enabling operation of bag conveyor motor 74 for a single cycle of operation. Such cycle of operation serves to advance the said bag to the testing position at station 30. Control logic 68 then provides a signal via line 71 to weight check means 76. If the latter determines the weight of the package to exceed a pre-set limit, such is reported via the line 73. If a signal is returned indicating the weight to be defective a seal check is not performed. If, however, the weight is satisfactory a signal is enabled via line 75 enabling performance of the seal check test by means 78. The results of this latter test are transferred to the control logic via line 77.

As previously indicated, if either the weight or seal check test determine the bag to be defective, a REJECT signal is transferred and stored within control logic 68. Upon the next cycle of operation of the machine ensuing (due to incidence of a further bag upon the photocell 64) bag conveyor motor 74 is operated for the further cycle of operation. Bag conveyor 28 previously referred to, moves the bag from test station 30 to accumulator tray threshold 37. If the cited REJECT signal has been stored in the control logic, upon the said next cycle of operation of the bag conveyor motor, the bag conveyor paddle at the threshold 37 will push the rejected bag to the reject chute 48— as suggested by the dotted line 81. If, on the other hand, the REJECT signal has not been associated with the package in question, the accumulator conveyor motor 80 is activated via line 83, to displace the acceptable package onto accumulator tray 36. The position to which the said packages are displaced laterally is determined by control logic 68, via a series of microswitches which are tripped as the accumulator paddles traverse from threshold 37 toward accumulator tray 36. These also provide means for counting the number of bags thus accumulated.

Upon control logic 68 indicating that the desired number of bags have thus been accumulated at tray 36, signals are sequentially enabled via lines 85, 87 and 89 to vertical motor 82, to the vacuum (from source 52) enabling means 90 for pickup head 46, and to horizontal motor 88. Assuming, in particular, that pickup head 46 has been returned to its position overlying the accumulator tray 36, vertical motor 82 is thus enabled, permitting the head to descend toward the packages to be transferred. A vertical position determining means 84 is associated with speed control means 86 for the pickup motor during this operation; in particular a series of microswitches are mounted along the linear path of progress of the carrier for the vacuum head, so that by successive tripping of the said switches the rate of descent of the head may be gauged and controlled. This is an important aspect of the present operation in that it is desired that the head be lowered at a relatively high rate of speed initially, so as to effect all operations with rapidity, and yet it is also desired that the speed of approach be sharply diminished as the head comes into proximity to the said bags. This decrease in rate of approach assures that the vacuum cups of the pickup head do not suddenly jar the surface of the bag, but rather permit such bag surface to be slowly drawn to the suction cups, thereby assuring positive engagement therewith. After the engagement occurs and the bags are lifted, horizontal motor 88 is actuated to effect transverse movement of the head, with the bags, across member 44.

Control logic 68 also is seen, via a control line 96, to activate box conveyor motor control 94, which in turn operates box conveyor motor 92. The latter serves to advance cases such as at 70 along box conveyor 53. Upon the box reaching its desired loading position, a photocell traversing the path of forward progression of the box at approximately the loading station (not explicitly shown), is intercepted so that photocell means 100 provides a signal through line 102, disenabling the motor. Thereupon the loading and layering functions are accomplished as previously set forth, until the box is completely packed. As such time a signal is provided via line 104 from logic 68 to photocell disrupt means 98. The latter means may typically include an arm at the box conveyor belt 56, which serves to slightly displace the box vertically out of the path of the photocell-light source combination, so that the box conveyor motor is again enabled to advance the loaded box, until the following box impinges across the photocell-light source to stop motor operation with box 70 stopped at the loading zone.

Figures 3, 5:
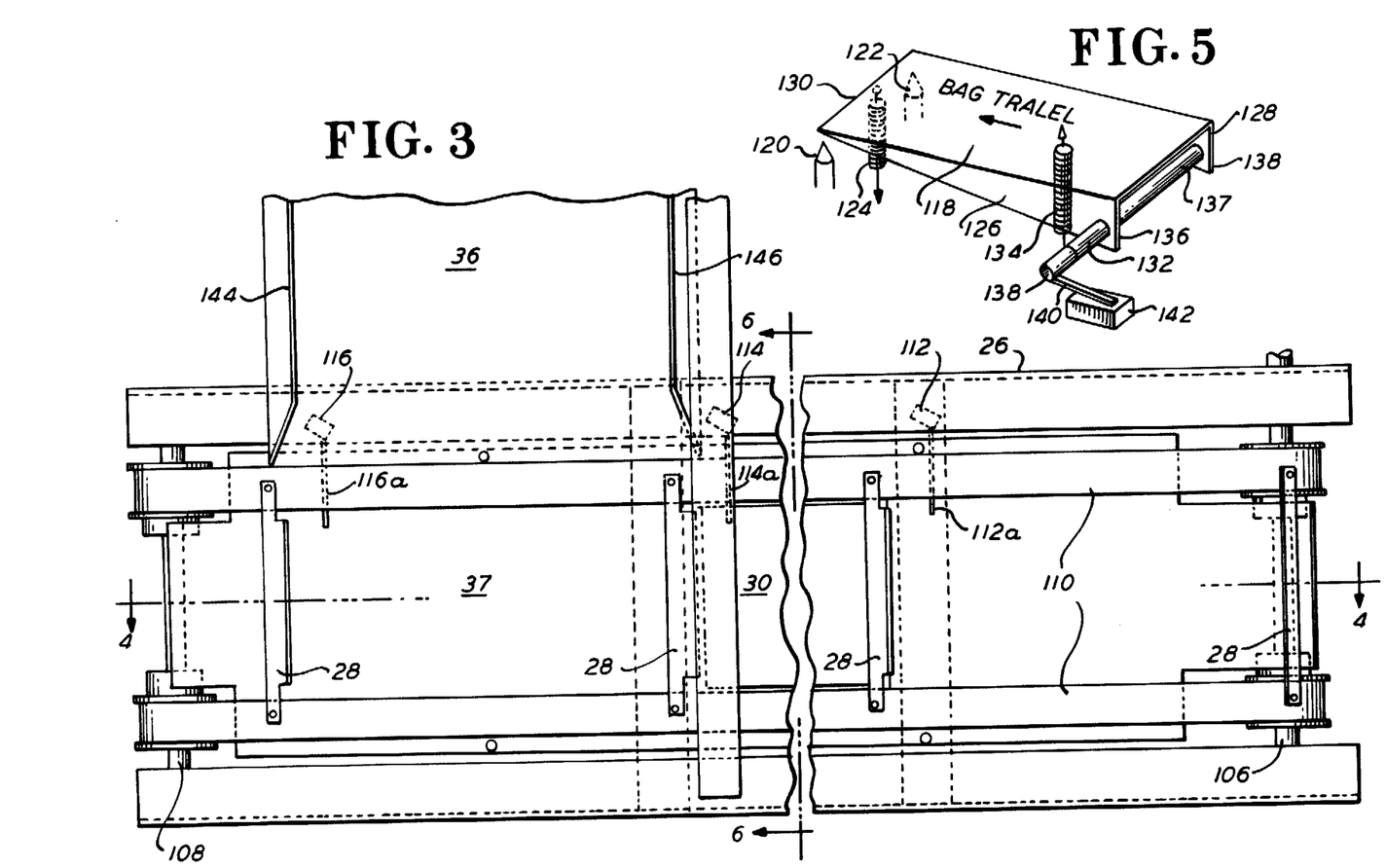
FIG. 3 is a plan view of that portion of the apparatus including the weighing and pressure check station, and the adjoining accumulator tray.
FIG. 5 is a simplified schematic diagram illustrating operation of the weighing platen portion of the present apparatus.

In FIG. 3 a top plan view appears of that portion of apparatus 20 including the bottom of weighing and pressure check station 30, and the adjoining accumulator tray 36. The bag conveyor frame 26 is thus seen to include a pair of rollers 106 and 108 mounted for rotation at opposite ends of the said frame. In the sense of the present Figure, the bags to be tested enter from the right side of the drawing. The series of bag conveyor paddles 28 are seen to be secured to a continuous drive belt 110, which passes about the rollers; the said rollers are driven by any convenient means, such as the conveyor motor 74 previously referred to. A series of microswitches 112, 114 and 116 are positioned at frame 26 and spaced along the path of progression of the conveying paddles. Arms 112a, 114a and 116a are associated with each of the microswitches and project into the path of movement of the paddles by movement of the conveyed materials. The said switches, by providing indication of passage of the packages, serve to provide signals to logic control block 68 for enabling part of the functions previously referred-to.

Figure 4:
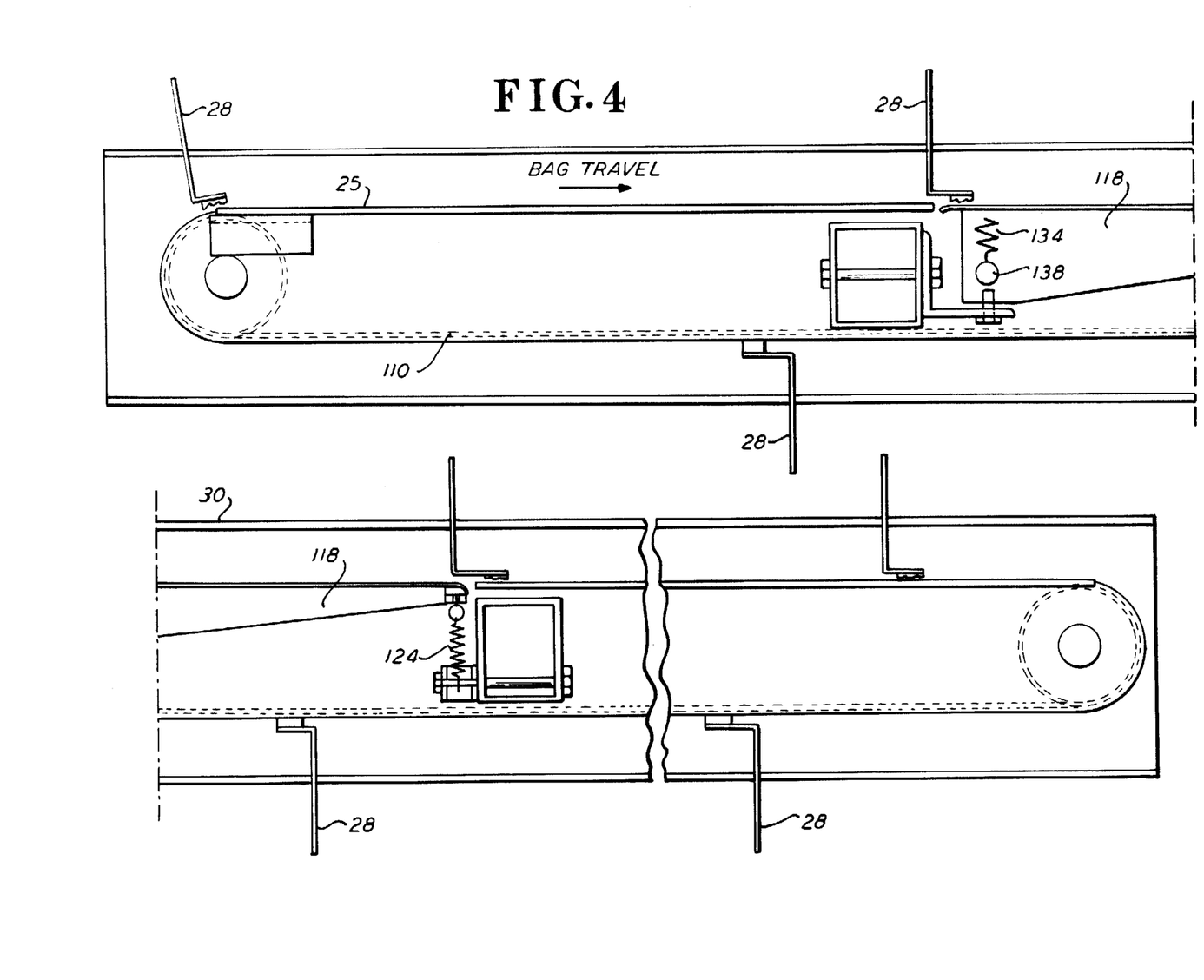
FIG. 4 is a simplified sectional view taken along the line 4—4 of FIG. 3.

Weighing and pressure check are, as previously indicated, accomplished at the station generally designated 30. A weighing platen 118 underlies this station and its mode of operation may be better appreciated by reference to the schematic perspective view of FIG. 5, and to the simplified in sectional view of FIG. 4. As seen therein, the platen is held at its far end against the pivot points 120 and 122 by a spring biasing means 124. The platen includes lateral portions 126 and 128, which diverge away from the pivot end 130 of the platen. A cylindrical tube 132 passes through the flaring ends 136 and 138 of portions 128 and 130, and a spring 134 biases platen 118 to a level equilibrium position. As the incoming package (pushed by paddles 28, which are carried by belts 110) passes onto platen 118, the end 136 thereof undergoes downward displacement to a degree dependent upon the weight of the said package. If the weight is sufficient to meet the bias-setable, by for example, varying the tension on spring 134, the projecting end 138 of tube 132 is displaced against the trip-arm 140 of a microswitch 142. When such event occurs, a signal is thereby enabled indicating that the package is satisfactory. On the other hand, the absence of such signal may be taken as an indication that the package in question is too light and therefore rejectable.

It may be noted in the foregoing connection, that it is, of course, not deemed to render the package defective should the weight be excessive to the limit of interest. In other words, the package that is "overweight" is not, from the viewpoint of a consumer, objectionable; rather only one which is beneath a prescribed minimum amount. It will further be appreciated that the mechanism set forth is particularly effective for the present purpose in that one does not seek by its operation to perform any precise weighing of the package. Hence one need not await an equilibrium position to be reached in platen 118. Rather, one merely examines the initial peak displacement of the platen as the package passes upon it. Since furthermore, the apparatus shown in FIG. 5 is very compact, and undergoes a minimal displacement during the weight operation, it will be clear that the functions of the weighing station are enabled with great rapidity, and with minimum space requirements.

The accumulator tray threshold area 37 is also seen in FIG. 3, and it is further noted that a pair of guide rails 144 and 146, extend from this threshold area to guide packages, which are in accordance with prior remarks displaced toward accumulator tray 36.

Figure 6:
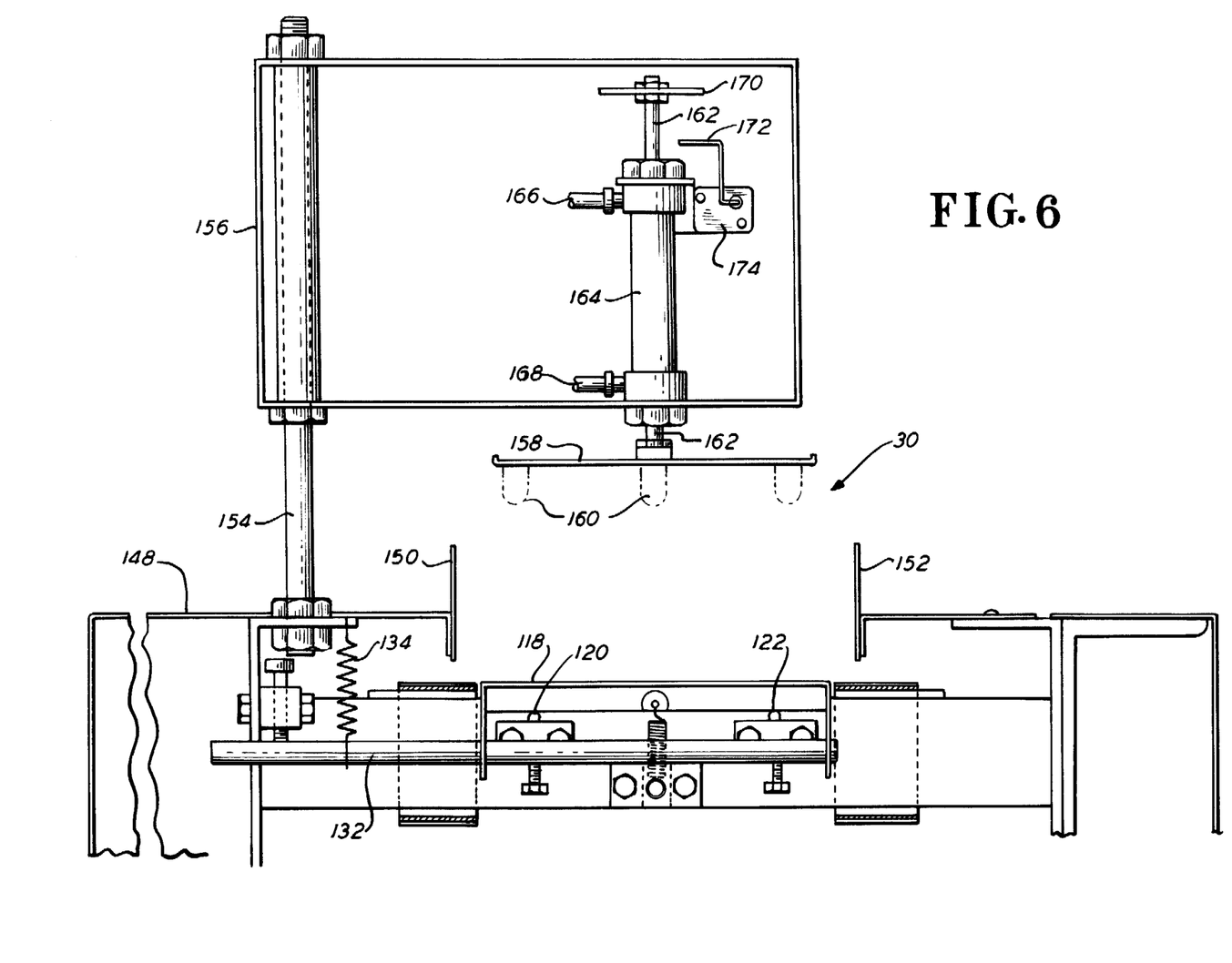
FIG. 6 is a view taken along the line 6—6 of FIG. 3, simplified to depict certain key elements of the weighing and pressure check station.

In FIG. 6 a view appears along a line 6—6, looking in the direction of the weight and seal check station 30 from a point somewhat downstream from the input end of apparatus 20. The view is considerably simplified, in order to depict certain key elements of the weighing and pressure check station. In this view the top surface of weight platen 118 is seen, as are pivot points 120 and 122 previously referred to. The biasing spring 134 connecting to bar 132, is also seen in this view. For purposes of orientation, it will also be noted that the side guide elements 150 and 152 abounding station 30 at the conveying surface are evident in the drawing.

Extending upwardly from the frame portion 148, is a vertical member 154, which serves to support the housing 156 for the motive elements driving pressure test platen 158. The latter is seen to preferably be a flat surfaced plate-like structure, although depending upon the packages to be tested the lower end thereof can include rounded projections — as is schematically suggested in shadow at 160. Platen 158 is affixed to a vertically movable rod 162, which is mounted to a piston (not explicitly seen) pneumatically-driven within the cylinder 164. The cylinder 164 is of conventional design, a model of this type being, for example, available from the Bimba Corporation.

In accordance with the preferred mode of operating the present device, a fixed pneumatic pressure is applied to the back, or driving, side of the piston, through input line 166, when it is desired to perform a sealing test. At the same time a constant pressure is applied at the forward end of the cylinder, through the input line 168. The piston thus begins to descend, and it will be clear that its forward motion will cease at such time as the resistive pressure below the driven piston becomes equal to the fixed pressure atop the piston. This resistant pressure, in turn, is composed of two components, firstly, the input pressure at line 168, and secondly, the resistive pressure developed as the platen bears against the flexible bags during the test operation. In practice the pressure supplied to input line 166 is adjusted to a pre-set level, as by means of a controllable valve. Accordingly, it will be evident that the platen 158 will descend, and assuming that an acceptable, that is, gas-tight bag is located on the weighing platen, will stop at a particular point. On the other hand if the bag being tested is defective, that is to say, has a gas leak, the platen rather than stopping at the cited point, will continue to descend, stopping at some lower point at which the back pressure from the bag added to the pressure in line 168 equals that behind the piston; or assuming a continuing leak it will simply descend to some pre-set limit point and then stop. In either event, a projection 170 is secured to the upper portion of movable rod 162, which projection co-acts with an actuator arm 172 for a microswitch 174. If the descending rod passes the prescribed limit point the actuator arm is thus struck, closing microswitch 174 to provide a signal indication to logic block 68 that the package in question is defective.

Figure 7:
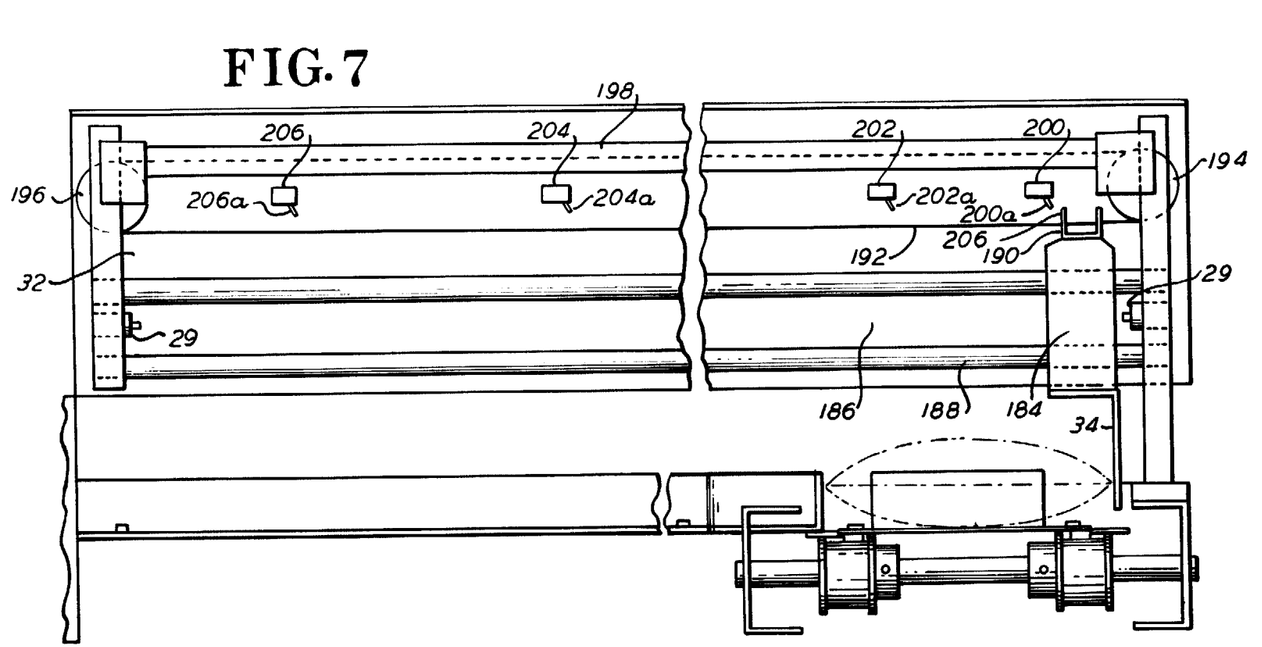
FIG. 7 is an elevational view of the accumulator conveyor motor housing, with the cover removed to show the motor elements.

In FIG. 7 an elevational view appears of a portion of the accumulator conveyor motor housing 22. The cover of housing 32 is removed in order to show the basic operation of the motive device. In particular it is seen that the accumulator paddle 34 is secured to a carrier block 184. The block 184, in turn rides upon a pair of parallel guide rails 186 and 188 which extend the length of the housing. Affixed atop carrier block 184 is a cable clamp 190 which engages the cable 192. The latter passes about a pair of rollers 194 and 196 at alternate ends of the housing, and is driven by a pneumatic cylinder and piston 198. The latter is of conventional design, pneumatic pressure being applied in sequence at both ends of the cylinder in order to displace the piston back and forth to reciprocate the carrier block 184 with the paddle 34. A series of microswitches 200, 202, 204 and 206 are spaced along the path of travel of carrier block 184 and include trip arms 200a, 202a, 204a and 206a, which are engageable by a projection 206 carried by block 184. Circuits are thereby enabled as the block traverses, which provide control signals into control logic 68. Such signals, as previously indicated, both enable counting of the accumulated packages, as well as positioning of the several packages on the accumulator tray in side-by-side fashion; that is to say, that the tripping of a given switch enables appropriate pressure outputs in the pneumatic system to terminate the movement of the paddle toward the accumulator tray at a point appropriate to positioning a given package.

Figure 8:
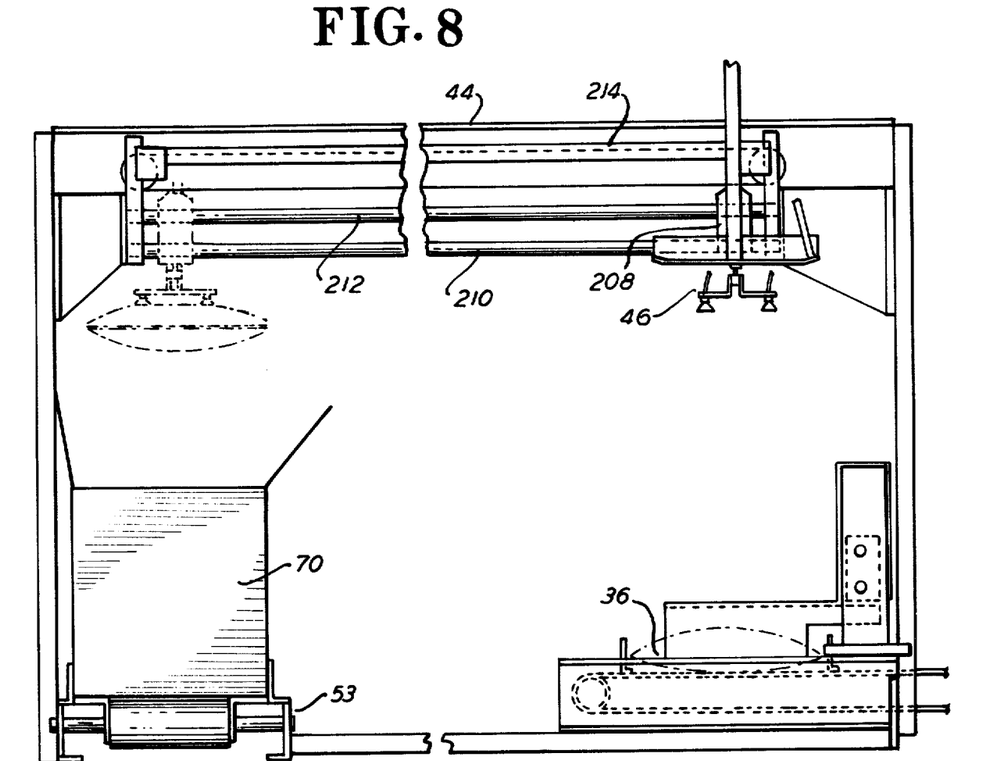
FIG. 8 is an elevational view of the cross member and part of the box conveyor, and illustrates the manner in which the pickup head traverses between the accumulator tray station and the box conveyor station.

In FIG. 8 an elevational, partial view appears, of the cross member 44 and part of the box conveyor 53. This view illustrates the manner in which pickup head 46 traverses between the accumulator tray 36 and the box conveyor station. In particular it is seen in this view that pickup head 46 is conveyed by a carrier block 208, which, in analogous fashion to the motive mechanism discussed in connection with FIG. 7, is mounted for movement along the pair of guide rails 210 and 212. Similarly, a pneumatic cylinder and piston 214 provide the driving force for moving a cable (not shown), secured to carrier block 208. Furthermore, in a similar fashion discussed in connection with FIG. 7, microswitches (not shown) are positioned along the path of travel of the carrier block 208, to enable signals indicative of the position of the position of the block along the rails. In the present instance mid-positions along the rail are not of particular interest, but rather the end points thereof; and accordingly only a pair of such microswitches and associated trip arms at opposite ends of the course of travel of the carrier block are required. Once again, the tripping of these microswitches provides input signals, enabling stoppage of the traversing path of the carrier block, and also may initiate the descent of the pickup head. It should be appreciated that in the case earlier mentioned where a rectangular array of packages is to form a layer, microswitches and associated trip arms may be provided at the vertical midpoints along the rail, in order to enable signals stopping block progression at the mid-points so as to then deposit the associated rows of packages. Shock absorbers 29 are seen at opposite ends of the path of block 184. There are commercially available dashpot type units (available, e.g., from Ace Controls, Inc. of Farmington, Mich.) which serve to arrest movement of the block rapidly and safely.

Figure 9:
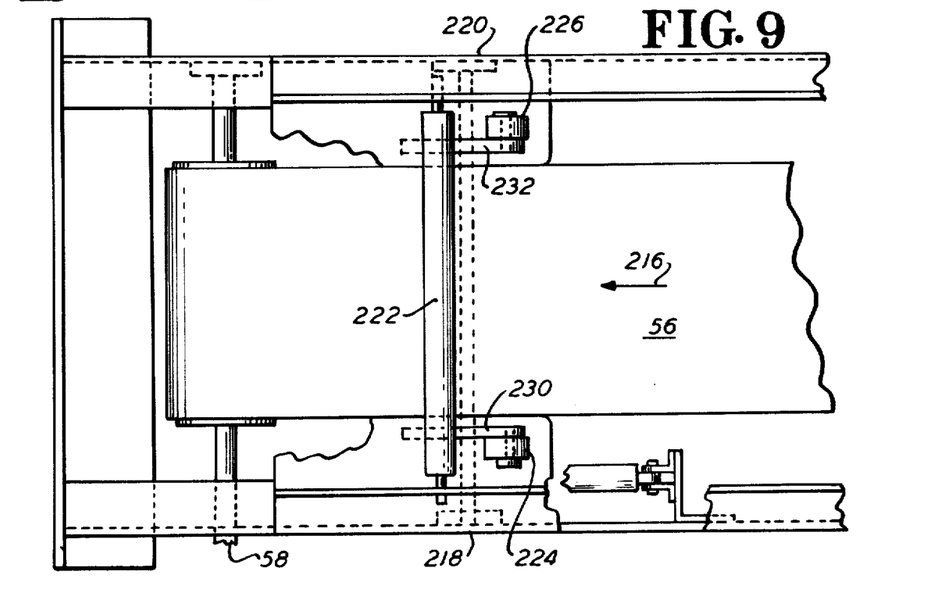
FIGS. 9 and 10 are, respectively, a plan and elevational view of a portion of the box conveyor station.
Figure 10:
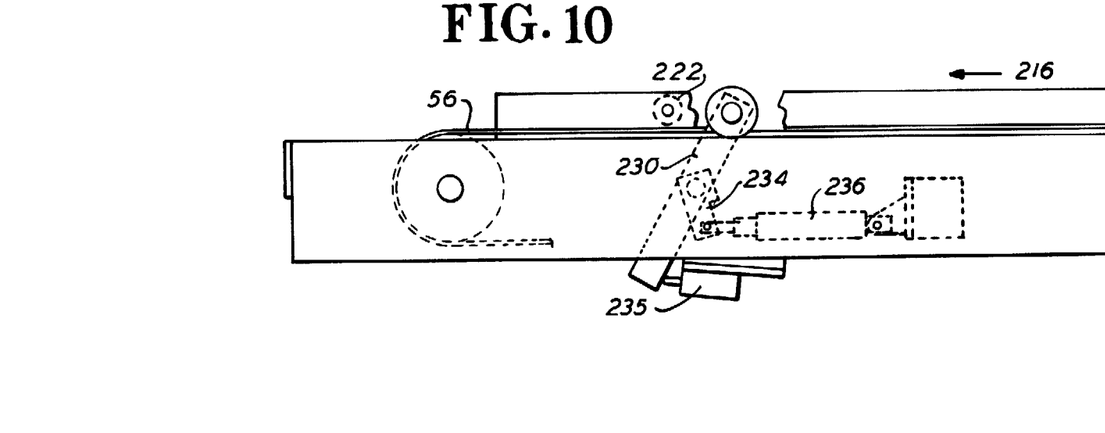

FIGS. 9 and 10 are, respectively, plan and elevational views of a portion of the output end of box conveyor 53. As may be seen therein cartons 70 progressing along conveyor belt 56 in the output direction indicated by arrow 216, normally intercept a photocell light-source pair which is oriented at the location 218, 220. This, in turn, provides an output signal to control logic means 68 (FIG. 2), which stops the box conveyor motor which is connected to shaft 58, bringing case 70 to rest at stop roller 222. At this point the box is in its normal load position, and loading and layering of packages may be carried out. In order to enable movement of a fully loaded box from the load position, and passage of a further empty box to such position, a pair of lift rollers 224 and 226 are provided upstream of stop roller 222. During the normal load operation, these lift rollers are vertically recessed below the plane of conveyor belt 56. As is best seen, however, in the elevational view of FIG. 10, each lift roller is carried by an arm 230 and 232, in turn interconnected through a linkage mechanism 234 to a pneumatically driven cylinder and piston 236. Upon the box being fully loaded, as indicated by a predetermined number of package deposits therein from pickup head 46, logic means 68 enables a pneumatic input to piston and cylinder 236 to raise the lift rollers 224 and 226 to the position shown in FIG. 10. This, in turn, raises the overlying end of the case 70 at the load zone, displacing the forward portion of the case above the light path of photocell light-source pair 218, 220. Thereby, as has been discussed in connection with FIG. 2, disruption of the photocell intercept 100 occurs, to permit box conveyor motor 92 to be activated and a case 70 to be advanced atop and over the stop roller 222. The bottom of arm 230, 232 also bears against the arm of a suitable switch 235 to provide control signals permitting pneumatic cylinder and piston 236 to return rollers 224, 226 to their recessed position after passage of a sufficient duration of time to permit removal from the load station of the old case. Thereupon, as the next case impinges across the path of photocell-light source pair 218, 220, a signal is enabled in the manner previously indicated, to terminate operation of box conveyor motor 92, thereby permitting the new box to be retained at the load position.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly the invention is to be broadly construed, and limited only by the scope and spirit of the claims now appended hereto.

I claim:

1. Apparatus for testing flexible packages and emplacing acceptable packages in a receiving receptacle, comprising in combination:
    sealing state testing means for determining presence of defects in the sealing state of said package;
    weight testing means for determining whether said package exceeds a pre-selected minimum acceptable weight;

means for receiving said flexible package and conveying said package to said sealing state testing means; and to said weight testing means;

means responsive to the said determinations at said sealing state and at said weight testing means, for rejecting a package found by either such means to be defective, and displacing such package from the processing stream of said apparatus;

means for accumulating a pre-selected number of packages determined to be acceptable by both said sealing state and said weight testing means, at a first location at said apparatus;

means for positioning a case to be loaded with a plurality of said acceptable packages, at a second location at said apparatus; and means for transferring said accumulated packages from said first location to said second location, and depositing said packages in said case.

2. Apparatus in accordance with claim 1, wherein said sealing state testing means comprises a testing platen, moveable toward a package to be tested; means to advance said platen against such package; means to stop said advancement of said platen at a predetermined resistive force caused by the resultant compression of said bag; and means to indicate resultant displacement of said platen beyond a limit point, whereby to indicate an inadequate resistive force due to a leak at said package.

3. Apparatus in accordance with claim 2, wherein said platen is pneumatically activated by a constant pressure applied behind a piston by a pneumatic motor driving said platen.

4. Apparatus in accordance with claim 3, wherein said constant pressure is adjustable to permit testing of packages with specified characteristics.

5. Apparatus in accordance with claim 1, wherein said weight testing means comprises a generally horizontally oriented platen positioned in the path of conveyance of said packages through said apparatus; said platen being pivoted at one end, with the opposite end thereof being elastically displaceable in a downward direction by said packages impinging thereon; said platen having actuating means moveable with the displaceable end; and switching means being positioned in the displacement path of said actuating means, said switching means being actuated by displacement of said platen beyond a selected point, to provide a signal indicating that said package exceeds a corresponding prescribed weight.

6. Apparatus in accordance with claim 5, wherein said displaceable end of said platen is restrained by spring means biasing said end in an upward direction, said spring means being adjustable to vary the weight at which said switch is actuated.

7. Apparatus in accordance with claim 2, wherein said transferring means comprises a vacuum head, first motive means for displacing said head vertically toward and away from said accumulated packages and said carton, second motive means for displacing said head horizontally between said first and second locations, and means for actuating the vacuum to said head to effect pick-up of said packages, and to deactivate said vacuum to deposit said packages at said carton.

8. Apparatus in accordance with claim 7, including means acting during the last portion of the descent of said head, to slow the vertical displacement rate of said head toward said packages, whereby said packages may be drawn to said head during said last portion of head descent.

9. Apparatus in accordance with claim 7, including switching means located along the path of vertical and horizontal movement of said head, said head being movable with means interacting with said switch means to provide control signals indicative of the progressive movement of said head; and logic means responsive to said control signals and controlling said first and second motive means and said vacuum actuation means, for enabling control of said head movements.

10. Apparatus in accordance with claim 9, wherein said switching means provide control signals during vertical descent of said head toward said carton, thereby allowing deposit of a set of said accumulated packages at a pre-set level in said carton to enable layering of said deposited packages.

11. Apparatus for testing flexible packages and emplacing acceptable packages in a receiving receptacle, comprising in combination:

sealing state testing means for determining presence of defects in the sealing state of said package; said means comprising a testing platen moveable toward said package; means to advance said platen against such package; means to stop said advancement of said platen at a predetermined resistive force caused by the resultant compression of said package; and means to indicate resultant displacement of said platen beyond a limit point, whereby to indicate an inadequate resistive force due to a leak at said package;

means for receiving said flexible package and conveying said package to said sealing state testing means;

means responsive to the said determination at said sealing state testing means, for rejecting a package found by such means to be defective, and displacing such package from the processing stream of said apparatus;

means for accumulating a pre-selected number of packages determined to be acceptable by said sealing state testing means, at a first location at said apparatus;

means for positioning a case to be loaded with a plurality of said acceptable packages, at a second location at said apparatus; and means for transferring said accumulated packages from said first location to said second location, and depositing said packages in said case.

* * * * *